US011632472B2

United States Patent
Belling

(10) Patent No.: US 11,632,472 B2
(45) Date of Patent: Apr. 18, 2023

(54) EVENT SUBSCRIPTION NOTIFICATION

(71) Applicant: NOKIA TECHNOLOGIES OY, Espoo (FI)

(72) Inventor: Thomas Belling, Erding (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 63 days.

(21) Appl. No.: 16/904,006

(22) Filed: Jun. 17, 2020

(65) Prior Publication Data
US 2020/0404106 A1     Dec. 24, 2020

Related U.S. Application Data

(60) Provisional application No. 62/863,049, filed on Jun. 18, 2019.

(51) Int. Cl.
| | |
|---|---|
| *H04M 15/00* | (2006.01) |
| *H04W 8/10* | (2009.01) |
| *H04W 36/00* | (2009.01) |

(52) U.S. Cl.
CPC ....... *H04M 15/66* (2013.01); *H04M 15/8038* (2013.01); *H04M 15/85* (2013.01); *H04W 8/10* (2013.01); *H04W 36/0022* (2013.01)

(58) Field of Classification Search
CPC .. H04M 15/66; H04M 15/8038; H04M 15/85; H04W 8/10; H04W 36/0022
See application file for complete search history.

(56) References Cited

U.S. PATENT DOCUMENTS

| | | | | |
|---|---|---|---|---|
| 2020/0267785 A1* | 8/2020 | Talebi Fard | ........ | H04W 40/246 |
| 2020/0404499 A1* | 12/2020 | Zhu | ..................... | H04L 12/2803 |

FOREIGN PATENT DOCUMENTS

| | | | | |
|---|---|---|---|---|
| AU | 2022201754 A1 * | 4/2022 | ............. | H04L 12/14 |
| CA | 3064904 A1 * | 6/2020 | ............ | H04W 76/27 |
| EP | 3 468 236 A1 | 4/2019 | | |
| WO | WO-2020225308 A1 * | 11/2020 | ............ | H04M 15/66 |

OTHER PUBLICATIONS

International Search Report and Written Opinion issued in co-pending International Patent Application No. PCT/US2020/038110, dated Oct. 1, 2020.
Ericsson: "23.502: Event triggers handling in Policy Framework," 3GPP Draft, S2-177699_WAS6908_Eventtriggers_23502, 3rd Generation Partnership Project (3GPP), vol. SA WG2, Oct. 30, 2017.

(Continued)

*Primary Examiner* — Khai M Nguyen
(74) *Attorney, Agent, or Firm* — Squire Patton Boggs (US) LLP

(57) ABSTRACT

Systems, methods, apparatuses, and computer program products for event subscription notification(s) are provided. One method may include providing, from a first network entity, a policy control request trigger about subscriptions for event exposure to a second network entity. The method may also include receiving a notification, from the second network entity, about the policy control request trigger, and installing or updating at least one policy and charging control (PCC) rule based on the information received in the notification from the second network entity.

42 Claims, 5 Drawing Sheets

(56) References Cited

OTHER PUBLICATIONS

LG Electronics: "Clarification on the roaming aspects of SMF related policy," 3GPP Draft, S2-184952_TS_23.502_SMF Related Policy in Roaming, 3rd Generation Partnership Project (3GPP), vol. SA WG2, May 22, 2018.

"3rd Generation Partnership Project; Technical Specification Group Services and System Aspects: Procedures for the 5G System; Stage 2 (Release 16)," 3GPP Draft, 23502-G10_CRS_Implemented, 3rd Generation Partnership Project (3GPP), vol. SA WG2, Jun. 8, 2019.

3GPP TR 23.724 V16.0.0, "3rd Generation Partnership Project; Technical Specification Group Services and System Aspects;Study on Cellular Internet of Thing (IoT) Support and Evolution for the 5G System (Release 16)", Dec. 2018.

3GPP TS 23.501 V16.0.0, "3rd Generation Partnership Project; Technical Specification Group Services and System Aspects; System Architecture for the 5G System; Stage 2 (Release 16)", Jun. 2019.

First Examination Report issued in corresponding Indian Patent Application No. 202117058327 dated Jun. 23, 2022.

\* cited by examiner

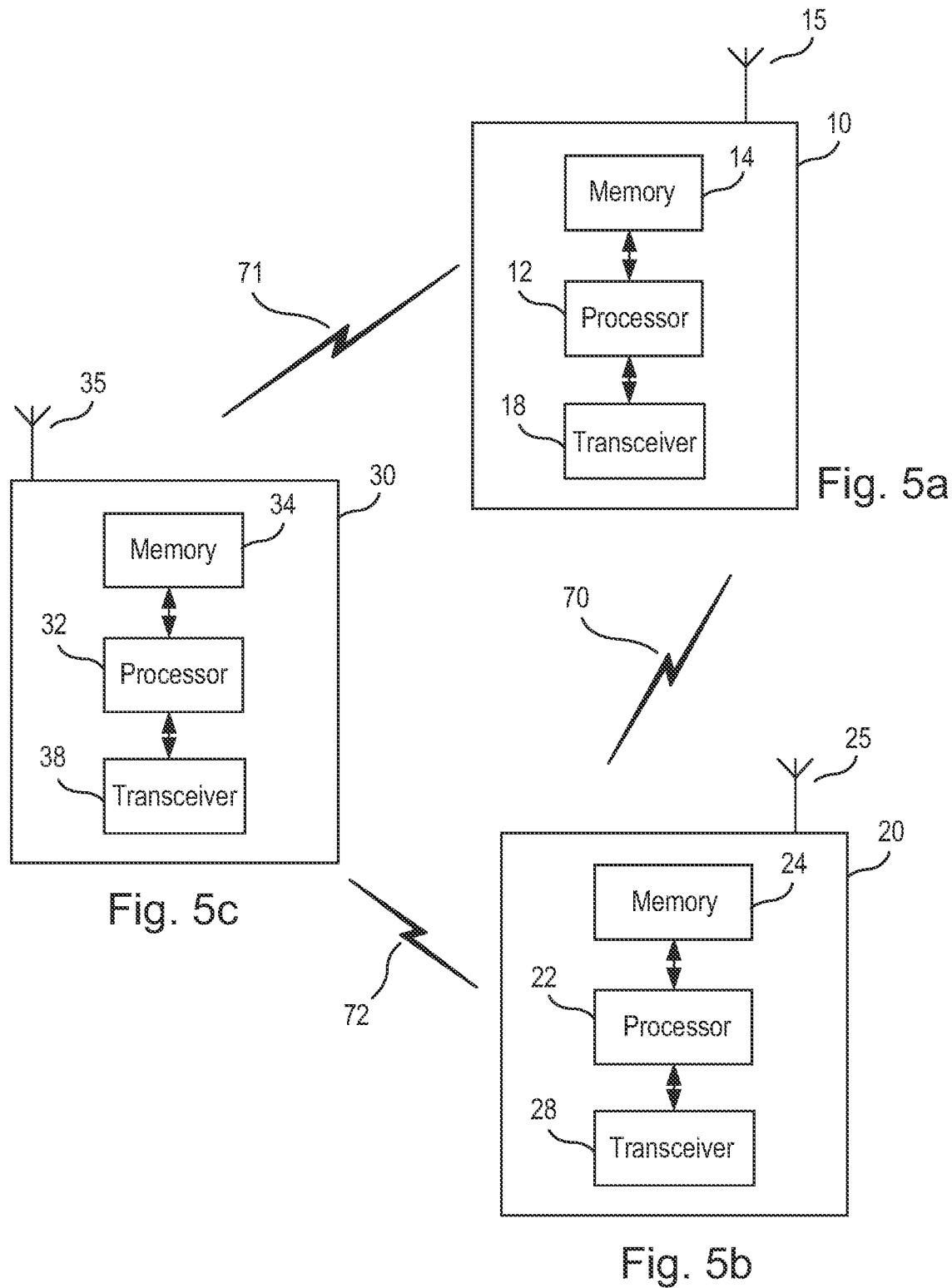

EVENT SUBSCRIPTION NOTIFICATION

CROSS-REFERENCE TO RELATED APPLICATIONS

This application claims priority from U.S. provisional patent application No. 62/863,049 filed on Jun. 18, 2019. The contents of this earlier filed application are hereby incorporated by reference in their entirety.

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods for event subscription notifications in such communications systems.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. 5G is mostly built on a new radio (NR), but a 5G (or NG) network can also build on E-UTRA radio. It is estimated that NR provides bitrates on the order of 10-20 Gbit/s or higher, and can support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) may be named gNB when built on NR radio and may be named NG-eNB when built on E-UTRA radio.

SUMMARY

An embodiment may be directed to a method that includes providing, from a first network entity, a policy control request trigger about subscriptions for event exposure to a second network entity, receiving a notification, from the second network entity, about the policy control request trigger; and installing or updating at least one policy and charging control (PCC) rule based on the information received in the notification from the second network entity.

Another embodiment is directed to an apparatus that may include at least one processor and at least one memory comprising computer program code. The at least one memory and computer program code may be configured, with the at least one processor, to cause the apparatus at least to provide a policy control request trigger about subscriptions for event exposure to a second network entity, to receive a notification, from the second network entity, about the policy control request trigger, and to install or update at least one policy and charging control (PCC) rule based on the information received in the notification from the second network entity.

Another embodiment is directed to an apparatus that may include means for providing a policy control request trigger about subscriptions for event exposure to a second network entity, means for receiving a notification, from the second network entity, about the policy control request trigger, and means for installing or updating at least one policy and charging control (PCC) rule based on the information received in the notification from the second network entity.

Another embodiment is directed to a method, at a first network entity, that may include receiving, from a second network entity, a new policy control request trigger about subscriptions for event exposure, receiving a subscription request for notifications about one or several events from a third network entity, and providing a notification, to the second network entity, about the subscription.

Another embodiment is directed to an apparatus including at least one processor and at least one memory comprising computer program code. The at least one memory and computer program code may be configured, with the at least one processor, to cause the apparatus at least to receive, from a second network entity, a new policy control request trigger about subscriptions for event exposure, receive a subscription request for notifications about one or several events from a third network entity, and provide a notification, to the second network entity, about the subscription.

Another embodiment is directed to an apparatus including means for receiving, from a second network entity, a new policy control request trigger about subscriptions for event exposure, receiving a subscription request for notifications about one or several events from a third network entity, and providing a notification, to the second network entity, about the subscription.

BRIEF DESCRIPTION OF THE DRAWINGS

For proper understanding of example embodiments, reference should be made to the accompanying drawings, wherein:

FIG. 5a illustrates an example block diagram of an apparatus, according to an embodiment;

FIG. 5b illustrates an example block diagram of an apparatus, according to an embodiment; and FIG. 5c illustrates an example block diagram of an apparatus, according to an embodiment.

DETAILED DESCRIPTION

Figure 1:
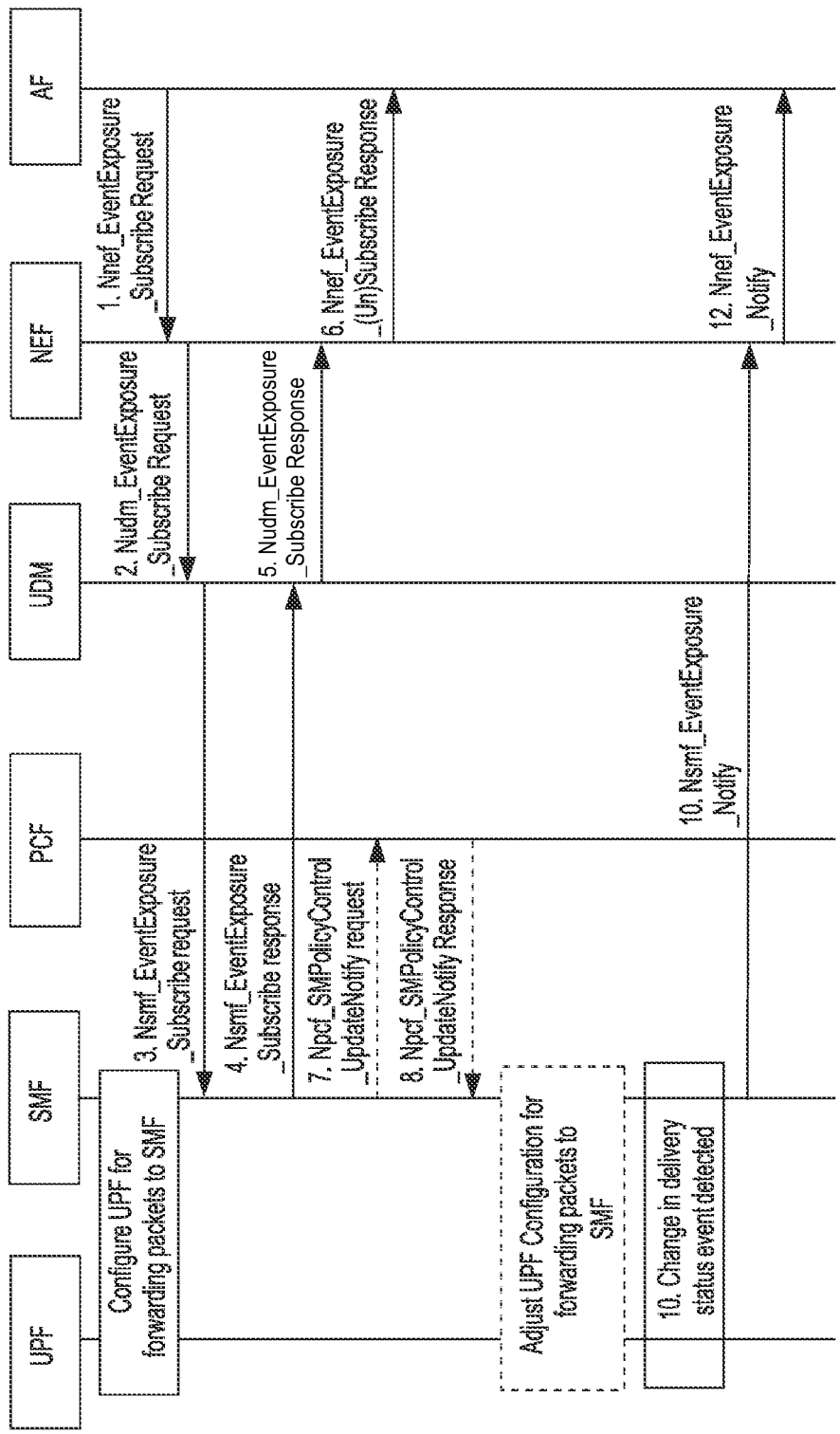
FIG. 1 illustrates an example signaling diagram, according to an embodiment.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for event subscription notification(s), is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or procedures discussed below may be performed in a different order and/or concurrently with each other. Furthermore, if desired, one or more of the described functions or procedures may be optional or may be combined. As such, the following description should be considered as merely illustrative of the principles and teachings of certain example embodiments, and not in limitation thereof.

The 3$^{rd}$ generation partnership project (3GPP) TR 23.724 investigated improvements for cellular Internet of Things (CIoT) support and evolution for the 5G System (5GS). One key issue was the support of High Latency communication. As part of that key issue, notifications for 'Downlink data delivery status' (e.g., buffered, transmitted, discarded) to be provided by the session management function (SMF) and a related subscription were introduced. To support scenarios where multiple application functions (AFs) send data to the same UE, the subscription can contain packet filters describing a particular application function as source of downlink packets; just notifications related to those packets should then be sent to that AF.

It may depend on operator policy whether to use policy and charging control (PCC) for UEs with high latency communication. If PCC is used, it may be necessary that the policy control function (PCF) is aware of a subscription for downlink data delivery status events, as the PCF should install a suitable PCC rule with packet filters matching those received in the subscription and an instruction to apply extended buffering. It is noted that the PCF is not aware whether buffering is done in session management function (SMF) or user plane function (UPF).

If buffering is done at the UPF, the SMF configures the UPF with specific packet detection rules matching the traffic from a specific AF to enable notification about buffered and discarded packets from that AF from UPF to SMF. The SMF, in turn, requires a PCC rule supplied from the PCF with those packet filters and a suitable detection priority as input. The PCF considers the installed PCC rules and assigns suitable priorities relative to other PCC rules to the PCC rule.

The network exposure function (NEF) may not be aware whether PCC is applied for a given UE when subscribing to notifications for 'downlink data delivery status' on behalf of an application function, although the signalling path for the subscription may depend on that.

Several signalling paths for event subscription from the NEF to SMF are described in 3GPP TR 23.724. In particular, these signalling paths may include NEF to PCF using Npcf_EventExposure_Subscribe, and PCF to SMF using Nsmf_EventExposure_Subscribe (Solution 25). Also, the signalling paths may include NEF to universal data management (UDM) using Nudm_EventExposure_Subscribe, and PCF to SMF using Nudm_EventExposure_Subscribe (Solution 39). Both of these solutions have been transferred to 3GPP TS 23.502, the subscription via PCF for the 'downlink data delivery status' event, and the subscription via user data repository (UDR) for the 'availability after DDN Failure' event. However, differences between the events do not justify the different subscription paths.

The signalling path via PCF requires that PCC is applied and is not suitable if an operator desires to avoid using PCC for UEs with high-latency communication. The signalling path via UDM seems to rule out that PCC is applied for affected UEs; but the NEF may not be aware whether PCC is applied for a given UE and select the signalling path based on that.

According to an embodiment, the PCF may provide a new policy control request trigger about subscriptions for event exposure received by the SMF. Then, when the SMF receives a subscription request for notifications about one or several events from another network function, for instance a subscription for the 'downlink data delivery status' event from the UDM using the Nsmf_EventExposure service, the SMF notifies the PCF about that subscription, e.g., by requesting new policies using the Npcf_SMPolicyControl_UpdateNotify service operation. In some embodiments, the SMF may also provide, to the PCF, possible parameters the SMF received as part of the subscription request within that notification. For example, the received parameters may include packet filters and a target address for notifications for the 'downlink data delivery status' event.

In one embodiment, the PCF may then install or update PCC rule(s) based on the information received from the SMF. For instance, in an embodiment, for the 'downlink data delivery status' event, the PCF may install a PCC rule with the packet filters, an indication to apply extended buffering, and a new "AF subscription to downlink data delivery status events IE", and/or the received notification target address.

FIG. 1 illustrates an example information flow or signaling diagram for downlink data delivery status. In particular, FIG. 1 includes an example procedure that may be used by the Application Function to subscribe to data delivery status notifications and to explicitly cancel a previous subscription. In an embodiment, cancelling may be done by sending Namf_EventExposure_UnSubscribe request identifying Subscription Correlation ID.

As illustrated in the example of FIG. 1, at 0, the SMF (e.g., in the no-roaming case the H-SMF or in the roaming case the V-SMF) may configure the relevant UPF to forward packets that are subject to extended buffering to the SMF. At 1, the AF may send a Nnef_EventExposure_Subscribe request to NEF requesting data delivery status for a UE or group of UEs. Traffic filter information may be included in the message to identify the source of the downlink IP or Ethernet traffic. The downlink delivery status events may include: downlink packet(s) in extended buffering event, downlink packet(s) discarded, and/or downlink packet(s) transmitted. In one example, downlink packet(s) in extended buffering event may be triggered every time a new downlink data packet is buffered with extended buffering matching the traffic filter information. In notifications about this downlink delivery status, the SMF may provide the extended buffering time as determined in clause 4.2.3.3 of TS 23.501. The downlink packet(s) discarded event may occur when extended buffering time, as determined by the SMF, expires or the amount of downlink data to be buffered is exceeded. The downlink packet(s) transmitted event occurs when the UE of the PDU Session becomes ACTIVE, and buffered data can be delivered to UE as per clause 4.2.3.3 of TS 23.501.

Continuing with the example of FIG. 1, at 2, NEF may send the Nudm_EventExposure_Subscribe Request to UDM. An identifier of the UE or group of UEs, traffic filter information, monitoring event received AF at step 1, and NEF notification endpoint may be included in the message. At 3, UDM may send the Nsmf_EventExposure_Subscribe Request message to the SMF and may include the identifier of the UE or group of UEs, traffic filter information, monitoring event and the notification endpoint of NEF received in step 2. At 4, SMF may send the Nsmf_EventExposure_Subscribe Response message to UDM. In one example, the notification steps 3 and 4 might not be applicable in cancellation case. At 5, UDM may send the Npcf_EventExposure_Subscribe response message to NEF and, at 6, NEF may send the Nsmf_EventExposure_Subscribe response to AF.

Optionally, at 7, if PCC is used for the UE, the SMF may send Npcf_SMPolicyControl_UpdateNotify message to the PCF indicating that the SMF has received a subscription for the downlink delivery status and may include traffic filter information, monitoring event and the notification endpoint received in step 3. If the step 3 subscription was for a group of UEs, step 7 may be executed separately for each UE within the group where PCC control is used. Optionally, at 8, PCF may send the PCC rule information including the received traffic filter and a request for notifications about downlink delivery status via the Npcf_SMPolicyControl_UpdateNotify reply message to the SMF(s) and may include the notification endpoint of NEF (implicit subscription to Notifications of the Nsmf_EventExposure service), and an indicator to apply extended buffering. According to another optional step, in the case of home-routed roaming, the H-SMF may create a QoS Flow corresponding to the PCC rule information received from the PCF and exchanges related signalling with the V-SMF.

Optionally, at 9, the SMF (e.g., in the no-roaming case the H-SMF and in the roaming case the V-SMF) may configure the relevant UPF to forward packets to the SMF according to updated information in step 8.

At 10, the SMF or UPF detects a change in Downlink Delivery Status event as described in clause 4.2.3 of TS 23.501. The SMF becomes aware that downlink packet(s) require extended buffering when trying to send packets to the AMF via a Namf_Communication_N1N2MessageTransfer service operation and obtaining a corresponding response. If buffering is in the UPF, the SMF may configure the UPF to buffer corresponding downlink packets and provide a notification when the UPF subsequently discards such packets (as per clause 5.8.3.2 in TS 23.501 [2]). If the UPF reports discarded packets or the SMF decides to discard packets, the "Downlink Packet(s) discarded event" is detected. The SMF detects that previously buffered packets can be transmitted by the fact that the related PDU session becomes ACTIVE. At 11, the SMF may send the Nsmf_EventExposure_Notify with Downlink Delivery Status event message to NEF and, at 12, the NEF sends Nnef_EventExposure_Notify with Downlink Delivery Status event message to AF.

Figure 2:
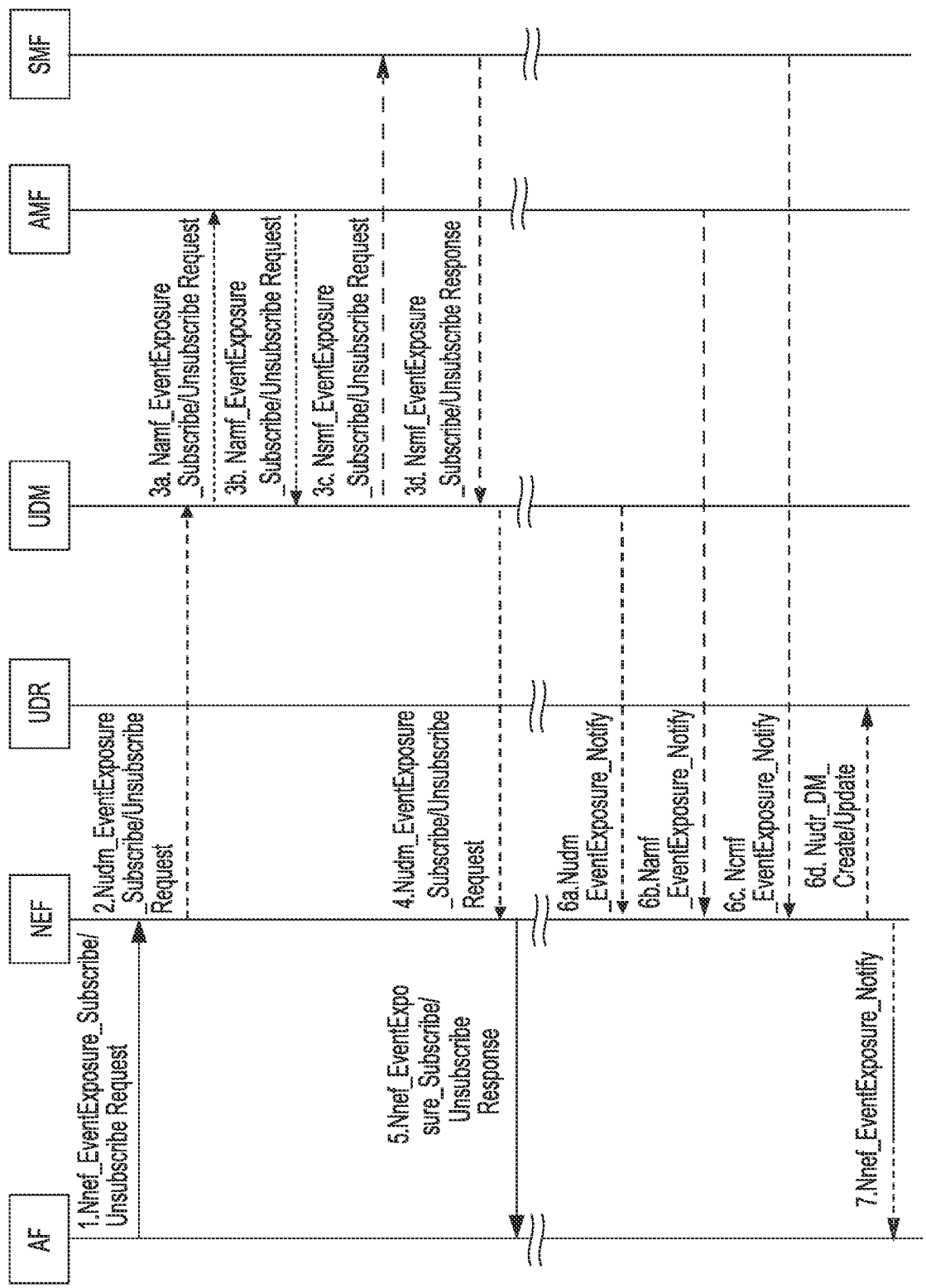
FIG. 2 illustrates an example signaling diagram, according to an embodiment.

FIG. 2 illustrates an example of a procedure that may be used by the AF to subscribe to notifications and to explicitly cancel a previous subscription. More specifically, FIG. 2 illustrates an example information flow or signaling flow diagram of Nnef_EventExposure_Subscribe, Unsubscribe and Notify operations, according to an embodiment. In one example, cancelling may be done by sending Nnef_EventExposure_Unsubscribe request identifying the subscription to cancel with Subscription Correlation ID.

As illustrated in the example of FIG. 2, at 1, the AF may subscribe to one or several event(s) (identified by Event ID) and may provide the associated notification endpoint of the AF by sending Nnef_EventExposure_Subscribe request. Event reporting information defines the type of reporting requested (e.g., one-time reporting, periodic reporting or event based reporting, for Monitoring Events). If the reporting event subscription is authorized by the NEF, the NEF records the association of the event trigger and the requester identity. The subscription may also include maximum number of reports and/or maximum duration of reporting information element (IE). At 2, conditionally depending on authorization in step 1, the NEF may subscribe to received event(s) (identified by Event ID) and provides the associated notification endpoint of the NEF to UDM by sending Nudm_EventExposure_Subscribe request. If the reporting event subscription is authorized by the UDM, the UDM may record the association of the event trigger and the requester identity. Otherwise, the UDM may continue in step 4 indicating failure.

Optionally, at 3a, if the requested event (e.g., monitoring of Loss of Connectivity) requires AMF assistance, then the UDM may send the Namf_EventExposure_Subscribe to the AMF serving the requested user. The UDM may send the Namf_EventExposure_Subscribe request to the serving AMF(s) (if subscription applies to a UE or a group of UE(s)), or all the AMF in the same PLMN as the UDM (if subscription applies to any UE). As the UDM itself is not the event receiving NF, the UDM may additionally provide the notification endpoint of itself besides the notification endpoint of NEF. Each notification endpoint may be associated with the related (set of) Event ID(s). This is to assure the UDM can receive the notification of subscription change related event. If the subscription applies to a group of UE(s), the UDM may include the same notification endpoint of itself, i.e., Notification Target Address (+Notification Correlation Id), in the subscriptions to all UE's serving AMF(s). It is noted that the same notification endpoint of UDM is to help the AMF identify whether the subscription for the requested group event is same or not when a new group member UE is registered.

Optionally, at 3b, AMF may acknowledge the execution of Namf_EventExposure_Subscribe. Also optionally, at 3c, if the requested event requires SMF assistance, then for existing PDU session(s) or during the PDU session establishment procedure, the UDM may select the SMF based on the slice information, the DNN and/or the AF Service ID and sends the Nsmf_EventExposure_Subscribe to the SMF(s) serving the requested user. As the UDM itself is not the Event Receiving NF, the UDM may provide the AMF's notification endpoint information, i.e., Notification Target Address (+Notification Correlation Id). Each notification endpoint may be associated with the related (set of) Event ID(s). It is noted that, in the home routed case, the UDM sends the subscription to the V-SMF via the H-SMF. Optionally, at 3d, the SMF may acknowledge the execution of Nsmf_EventExposure_Subscribe.

Optionally, at 4, UDM may acknowledge the execution of Nudm_EventExposure_Subscribe. If the subscription is applicable to a group of UE(s) and the maximum number of reports is included in the Event Report information in step 1, the number of UEs may be included in the acknowledgement. At 5, NEF acknowledges the execution of Nnef_EventExposure_Subscribe to the requester that initiated the request. Optionally, at 6a, the UDM depending on the event may detect that the event occurs and may send the event report, e.g., by means of Nudm_EventExposure_Notify message to the associated notification endpoint of the NEF along with the time stamp. Optionally, at 6b, the AMF depending on the event may detect that the event occurs and may send the event report, e.g., by means of Namf_EventExposure_Notify message to associated notification endpoint of the NEF along with the time stamp. If the AMF has a maximum number of reports stored for the UE or the individual member UE, the AMF may decrease its value by one for the reported event.

For both step 6a and step 6b, when the maximum number of reports is reached and if the subscription is applied to a UE, the NEF may unsubscribe the monitoring event(s) to the UDM and the UDM may unsubscribe the monitoring event(s) to AMF serving for that UE. Also for both step 6a and step 6b, when the maximum number of reports is reached for an individual group member UE, the NEF may use the number of UEs received in step 4 to determine if reporting for the group is complete. If the NEF determines that reporting for the group is complete, the NEF may unsubscribe the monitoring event(s) to the UDM and the UDM may unsubscribe the monitoring event(s) to all AMF(s) serving the UEs belonging to that group. When the maximum duration of reporting expires in the NEF, the UDM and the AMF, then each of these nodes may locally unsubscribe the monitoring event. Optionally, at 6c, depending on the event the SMF may detect that the event occurs and may send the event report, e.g., by means of Nsmf_EventExposure_Notify message to associated notification endpoint of the NEF along with the time stamp. Optionally, at 6d, the NEF may store the information received in steps 6a, 6b, or 6c in the UDR along with the time stamp using either Nudr_DM_Create or Nudr_DM_Update service operation as appropriate.

Optionally, at 7, depending on the event in steps 6a-6f, the NEF may forward to the AF the reporting event received by either Nudm_EventExposure_Notify and/or Namf_EventExposure_Notify.

Optionally, at 8, depending on the event, the AMF may detect the subscription change related event occurs, e.g. Subscription Correlation ID change due to AMF reallocation or addition of new Subscription Correlation ID due to a new group UE registered, it may send the event report, e.g., by means of Namf_EventExposure_Notify message to the associated notification endpoint of the UDM. It is noted that, in an embodiment, the notification steps 6 to 8 may not be applicable in the cancellation case.

Figure 3:
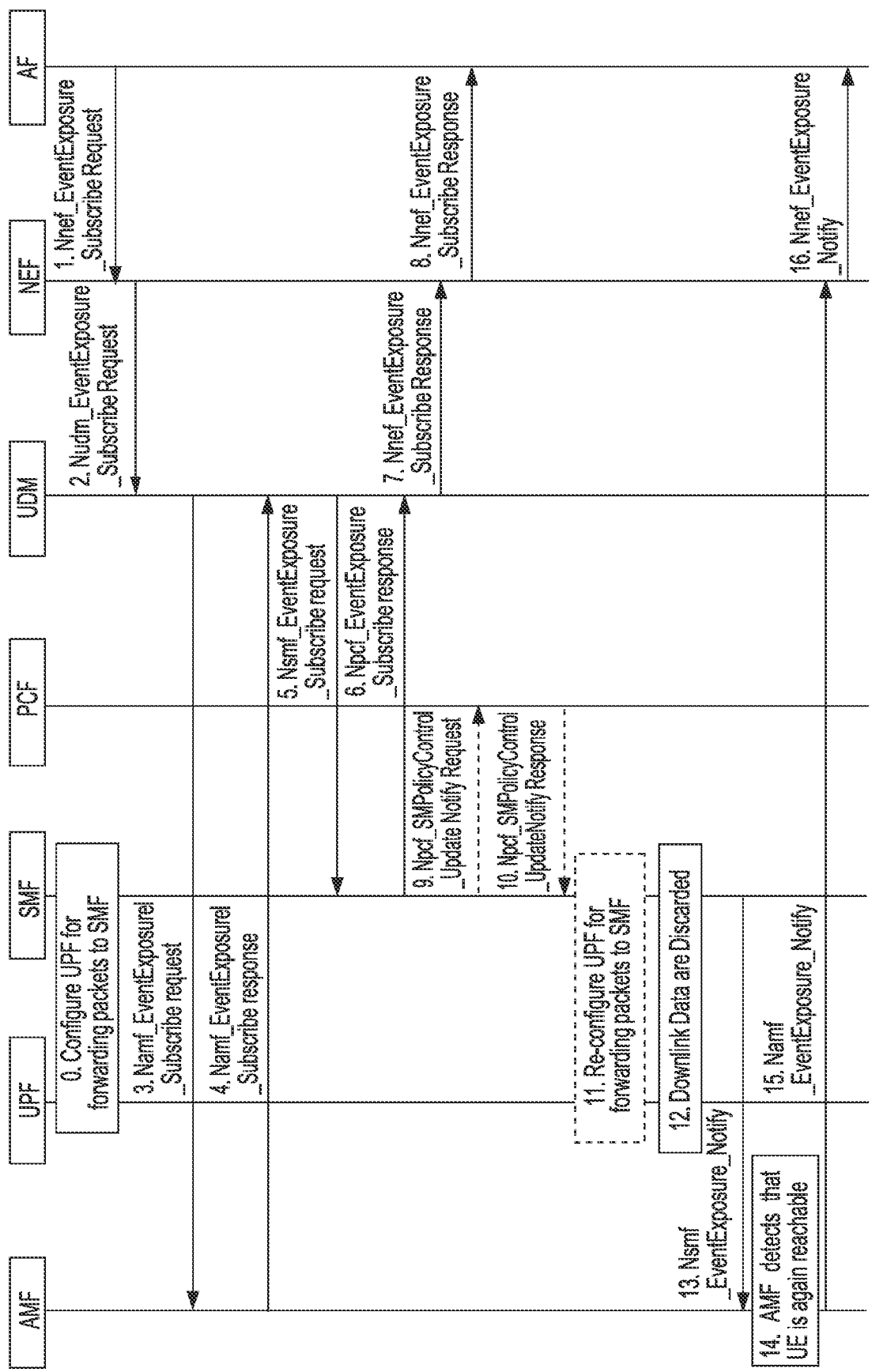
FIG. 3 illustrates an example signaling diagram, according to an embodiment.

FIG. 3 illustrates an example information flow or signaling flow diagram for downlink data delivery status, according to an embodiment. In one example, the procedure of FIG. 3 may be used by the Application Function to subscribe to notifications about availability after downlink data delivery notification failure. The NEF service operations information flow in clause 4.15.3.2.3 of TS 23.501 may be applied according to the detailed flow of FIG. 3.

As illustrated in the example of FIG. 3, at 0, the SMF (e.g., in the no-roaming case the H-SMF or in the roaming case the V-SMF) may configure the relevant UPF to forward packets that are subject to extended buffering to the SMF. At 1, the AF may send Nnef_EventExposure_Subscribe Request to the NEF requesting notifications for "Availability after DDN Failure" for a UE or group of UEs. Traffic filter information may be included in the message to identify the source of the downlink IP or Ethernet traffic. At 2, the NEF may send the Nudm_EventExposure_Subscribe Request to UDM. An identifier of the UE or group of UEs, traffic filter information, monitoring event received from AF at step 1, and NEF notification endpoint, may be included in the message.

At 3, the UDM may send the Namf_EventExposure_Subscribe to the AMF(s) which serve the UE(s) identified in step 2 to subscribe to "Availability after DDN Failure". A separate subscription may be used for each UE. The NEF notification endpoint received in step 2 may be included in the message.

At 4, the AMF may acknowledge the execution of Namf_EventExposure_Subscribe and may provide a notification target address and unique reference ID for subsequent Nsmf_EventExposure_Notify messages with Downlink Delivery Status event "Downlink Packet(s) discarded" (see step 13). At 5, the UDM may send the Nsmf_EventExposure_Subscribe Request to the PCF to request for notifications about Downlink delivery status "Downlink Packet(s) discarded." A separate subscription may be used for each UE. An identifier of the UE and traffic filter information, received in step 2, and AMF notification endpoint received in step 4 may be included in the message.

At 6, the SMF may send the Npcf_SMPolicyControl_Update Response message to UDM. At 7, UDM may send the Nudm_EventExposure_Subscribe response to NEF. At 8, NEF may send the Nsmf_EventExposure_Subscribe response to AF. Optionally, at 9, if PCC is used for the UE, the SMF may send Npcf_SMPolicyControl_UpdateNotify message to the PCF indication that the SMF has received a subscription for the downlink delivery status and may include traffic filter information, monitoring event and the notification endpoint received in step 3.

Optionally, at 10, PCF may send the PCC rule information including the received traffic filter and a request for notifications about downlink delivery status via the Npcf_SMPolicyControl_UpdateNotify reply message to the SMF(s) and may include the notification endpoint of NEF (implicit subscription to Notifications of the Nsmf_EventExposure service), and an indicator to apply extended buffering. Also optionally, in the case of home-routed roaming, the H-SMF may create a QoS flow corresponding to the PCC rule information received from the PCF and may exchange related signalling with the V-SMF.

Optionally, at 11, the SMF (e.g., in the no-roaming case the H-SMF or in the roaming case the V-SMF) may configure the relevant UPF to forward packets to the SMF according to updated information in step 10. At 12, the SMF may detect that the first packet is being discarded as follows (see also clause 4.2.3): the SMF becomes aware that downlink packet(s) require extended buffering when trying to send packets to the AMF via a Namf_Communication_N1N2MessageTransfer service operation and obtaining a corresponding response. If buffering is in the UPF, the SMF may configure the UPF to buffer corresponding downlink packets and provide a notification when the UPF subsequently discards such packets (as per clause 5.8.3.2 in TS 23.501 [2]). If the UPF reports discarded packets or the SMF decides to discard packets, the "Downlink Packet(s) discarded event" is detected.

At 13, the SMF may send the Nsmf_EventExposure_Notify message with Downlink Delivery Status event "Downlink Packet(s) discarded" to the AMF. If the UE is not reachable after the AMF received the notification from the SMF, the AMF may set a Notify-on-available-after-DDN-failure flag for the subscription identified by the notification reference id (see step 4). At 14, the AMF may detect the UE is reachable again and may inspect the Notify-on-available-after-DDN-failure flag to determine for each subscription related to that UE to determine if any notification is required. At 15, the AMF may send Namf_EventExposure_Notify message(s) with the "Availability after DDN Failure" for the NEF identified via the corresponding subscription in step 14. At 16, the NEF may send Nnef_EventExposure_Notify message with the "Availability after DDN Failure" event to AF.

According to certain embodiments, the Nudm_EventExposure_Subscribe service operation is an operation in which the NF consumer (NEF) subscribes to receive an event, or if the subscription is already defined in UDM, then the subscription is updated. Inputs to the Nudm_EventExposure_Subscribe service operation include the target of the subscription: UE(s) ID (SUPI or GPSI, Internal Group Identifier or External Group Identifier, or indication that any UE is targeted), Event filter containing the Event Id(s) (see clause 4.15.3.1) and Event Reporting Information defined in Table 4.15.1-1. Optional inputs may include expiry time, traffic filter (for downlink data delivery failure and downlink data delivery status events). Outputs of the Nudm_EventExposure_Subscribe service operation include operation execution result indication which, when the subscription is accepted: subscription Correlation ID, Expiry time (required if the subscription can be expired based on the operator's policy). Optional outputs may include first corresponding event report if corresponding information is available (see clause 4.15.1) and/or number of UE(s) if the External Group Identifier and Maximum Number of Reports are included in the inputs. The number of UEs indicates the number of UEs within the group identified by the External Group Identifier. The NEF may use this value to determine whether the monitoring event has been reported for all group member UEs.

In certain embodiments, buffering may be supported at either the UPF and/or SMF. The UPF may forward incoming packets to the SMF. The SMF may then use the Namf_Communication_N1N2MessageTransfer service to send them forward to the AMF. If the UE is in power saving state and temporarily unreachable, the Namf_Communication_ N1N2MessageTransfer reply requests downlink buffering. The SMF can then buffer the packets itself or configure the UPF accordingly. The SMF may become aware of the first buffered packet in that manner. If buffering in the UPF is used, the SMF may then configure the UPF to buffer packets (rather than forwarding them to the SMF). If buffering at the SMF is used, no re-configuration of the UPF is needed and the SMF may continue to receive all downlink packets and buffer them.

As outlined above, the SMF may decide to apply buffering and, as the SMF receives all incoming downlink packets while buffering, it can easily detect if any packets from a given source are buffered.

For low latency communication the SMF may directly become aware of the need for buffering and a notification may be used if source-specific reporting is required. According to the existing functionality, however, it is not possible for the SMF to detect whether packets of a given source are buffered at the UPF, unless separate packet detection rules are configured for each source; if the packets from several sources are combined via wildcarded filters in one packet detection rule, only the first buffered packet of any source will be reported without identification of the source.

The SMF can configure the UPF to send a notification about the first buffered packet for a packet flow, as identified by a packet detection rule. The SMF identifies the packet flow via a packet detection rule and associates a forwarding action rule with action "buffer" and a request for notification of the first buffered packet. The notification identifies the packet flow via the packet detection rule identifier. Thus, packet filters may be provided as part of the configuration from the SMF in the packet detection rule. Packet detection rules are evaluated in a precedence order to resolve overlapping filters. This information may be typically derived from PCC rules. In this example, there is only a notification about the first buffered packet. The notification does not contain packet filter describing the packet, but contains a reference to the packet detection rule.

With respect to detection of discarded packets at the SMF, if the buffering is at the SMF, no UPF interaction is required and the SMF can identify the source(s) of the discarded packets.

With respect to detection of discarded packets at the UPF, the SMF can instruct the UPF to drop buffered (and subsequent incoming) packets. But the UPF can also autonomously start to discard buffered and incoming packets based on timers or the amount of buffered downlink data. However, for this case, there is no existing mechanism for a notification of discarded packets, and the N4 interface may require extensions.

Thus, in one embodiment, the SMF may identify the packet flow via a packet detection rule and associates a forwarding action rule with action "buffer" and a request for a new notification of the first discarded packet. The notification may identify the packet flow via the packet detection rule identifier.

For availability after DDN failure, when the SMF is informed that the UE is unreachable, the SMF interacts with the UPF to remove the buffered packets and requests the UPF to report the traffic information (e.g., Source IP address, Source port number) of the discarded packets. This assumes that the SMF does not configure the UPF to buffer but to immediately discard packets. It is existing N4 functionality to associate an action "drop" rather than "buffer" with a packet detection rule. However, in this case, there is no notification of discarded packets due to the "drop" action. None seems required, as traffic filters are configured by the SMF in the packet detection rule. If wildcarded filters are assumed in the packet detection rule, more detailed notifications about dropped packets may be introduced. In one embodiment, a notification about every dropped packet may be provided. In another embodiment, the UPF may analyze dropped packets to detect flows with same source and destination, and notifies when a new flow is detected.

For the detection of transmitted packets, the SMF may obtain a notification if the UE is in CM-CONNECTED state via the Namf_EventExposure_Notify service operation. The SMF can then transmit packets it buffered or configure the UPF to do so.

For high latency communication and related event detection, the SMF may configure the UPF to forward incoming packets before high latency communication can start, i.e., at the establishment of the PDP session. Performing such a configuration only when a subscription for related event notification is received may not be appropriate because the basic functionality of buffering packets can be applied independent of any such subscription. On the other hand, the event subscription can provide packet filters for downlink packets from specific AFs. It seems very complicated to have configured information matching those packet filters before the AF communicated them, and a more generic configuration with wildcarded packet filters at the UPF should thus be assumed to be applied at the establishment of the PDP session. The SMF may be triggered to perform this configuration either based on PCC control or the user profile.

Certain solutions assume PCC control in which PCC provides the Policy information for extended buffering to the SMF during Session Management Policy Establishment/Modification. Other solutions do not consider that aspect and it can be assumed that it depends on operator policy whether to use PCC control for UEs with high latency communication.

For configuration of event detection if PCC is not used, in an embodiment, when receiving a subscription for downlink delivers status, the SMF acts as follows: If buffering is done at the SMF, the SMF can analyze each downlink packet and can easily report detected subscribed events also if packet filters are supplied in the subscription. Under the assumption that a wildcarded packet detection rule for forwarding downlink packets is already installed, no corresponding UPF configuration is required. If buffering is done at the UPF, and packet filters are supplied as part of the subscription, specific packet detection rules matching those packet filters may be installed. The corresponding logic in the SMF may also consider other already installed packet detection rules and their priorities and thus replicate policy control functionality that is normally assigned to the PCF.

For configuration of event detection if PCC is used, in an embodiment, the PCF should be aware of a subscription for 'Downlink data delivery status' events, as the PCF may need to install a suitable PCC rule with packet filters matching those received in the subsection and an instruction to apply extended buffering. It is noted that the PCF is not aware whether buffering is done in SMF or UPF.

As discussed above, for the signaling of event subscription from the NEF to PCF, different signaling paths are available. These signalling paths may include NEF to PCF using Npcf_EventExposure_Subscribe, and PCF to SMF using Nsmf_EventExposure_Subscribe (Solution 25), and/or the signalling paths may include NEF to universal data management (UDM) using Nudm_EventExposure_Subscribe, and PCF to SMF using Nudm_EventExposure_Subscribe (Solution 39).

According to one embodiment, the UDM signalling path may be used. If PCC is used, the SMF notifies the PCF via a new Policy Control Request Trigger about the subscription to the 'Downlink data delivery status' events. The PCF then installs or updates suitable PCC rules with matching packet filters and a new "AF subscription to downlink data delivery status events IE".

Therefore, according to certain embodiments, for high latency communication buffering both at UPF and/or SMF may be supported. In an embodiment, to support buffering at the UPF, a new notification from UPF to SMF about discarded packets may be provided. According to some embodiments, usage of PCC may be optional for high latency communication. In an embodiment, PCC rules for high latency communication may contain a new "extended buffering" IE. According to some embodiments, the UDM signalling path may be used. In an embodiment, if PCC is used, the SMF notifies the PCF via a new Policy Control Request Trigger about the subscription to the 'Downlink data delivery status' events. The PCF then installs or updates suitable PCC rules with matching packet filters and a new "AF subscription to downlink data delivery status events IE".

In view of the above, certain embodiments may address at least the question of, with respect to the "Information flow for downlink data delivery status" how the SMF detects the downlink delivery status. There are several related issues with respect to the current information flow: (1) Solution 25 in TR 23.724 requested PCC control of extended buffering, but such a PCC control is still missing; (2) PCC control should be optional; and (3) Packet filters related with downlink data delivery status imply UPF interactions (N4 impacts) to configure the UPF to provide notifications about the downlink data delivery status when the first packet is being buffered and subsequently discarded.

According to certain embodiments, traffic filters in the UPF have priorities that may be coordinated with other installed traffic filters. In an embodiment, this may be controlled by the PCF via PCC rules. The subscription for downlink data delivery status thus also may be integrated in PCC rules. The subscription to the Nsmf_EventExposure notification may be indirect via the Npcf_SMPolicyControl service.

In an embodiment, the subscription to the Nsmf_EventExposure notification may be indirect via PCC rule information of the Npcf_SMPolicyControl service. For that purpose, in one embodiment, an AF subscription to downlink data delivery status events IE may be added to the PCC rule. If PCC is used, the PCF may be notified about the subscription to the downlink data delivery status at the SMF to allow the PCF to provide policies as described above.

Table 1 below describes the Forwarding Action Rule (FAR) that defines how a packet may be buffered, dropped or forwarded, including packet encapsulation/decapsulation and forwarding destination, according to certain embodiments.

TABLE 1

| Attribute | Description | Comment |
|---|---|---|
| N4 Session ID | Identifies the N4 session associated to this FAR. | |
| Rule ID | Unique identifier to identify this information. | |
| Action | Identifies the action to apply to the packet | Indicates whether the packet is to be forwarded, duplicated, dropped or buffered. When action indicates forwarding or duplicating, a number of additional attributes are included in the FAR. For buffering action, a Buffer Action Rule is also included and the action can also indicate that a notification of |

TABLE 1-continued

| Attribute | Description | Comment |
|---|---|---|
| | | the first buffered and/or a notification of first discarded packet is requested (see subclause 5.8.3.2). |
| Network instance (NOTE 2) | Identifies the Network instance associated with the outgoing packet (NOTE 1). | |
| Destination interface (NOTE 3) | Contains the values "access side", "core side", "SMF" or "N6-LAN". | Identifies the interface for outgoing packets towards the access side (i.e. down-link), the core side (i.e. up-link), the SMF or, the N6-LAN (i.e. the DN or the local DN). |
| Outer header creation (NOTE 3) | Instructs the UP function to add an outer header (e.g. IP + UDP + GTP + QFI, VLAN tag), IP + possibly UDP to the outgoing packet. | Contains the CN tunnel info, N6 tunnel info or AN tunnel info of peer entity (e.g. NG-RAN, another UPF, SMF, local access to a DN represented by a DNAI). Any extension header stored for this packet shall be added. |
| Send end marker packet(s) (NOTE 2) | Instructs the UPF to construct end marker packet(s) and send them out as described in clause 5.8.1. | This parameter should be sent together with the "outer header creation" parameter of the new CN tunnel info. |
| Transport level marking (NOTE 3) | Transport level packet marking in the uplink and downlink, e.g. setting the DiffServ Code Point. | |
| Forwarding policy (NOTE 3) | Reference to a preconfigured traffic steering policy or http redirection (NOTE 4). | Contains one of the following policies identified by a TSP ID: an N6-LAN steering policy to steer the subscriber's traffic to the appropriate N6 service functions deployed by the operator, or a local N6 steering policy to enable traffic steering in the local access to the DN according to the routing information provided by an AF as described in clause 5.6.7. or a Redirect Destination and values for the forwarding behaviour (always, after measurement report (for termination action "redirect")). |
| Request for Proxying in UPF | Indicates that the UPF shall perform ARP proxying and/or IPv6 Neighbour Solicitation Proxying as specified in clause 5.6.10.2. | Applies to the Ethernet PDU Session type. |
| Container for header enrichment (NOTE 2) | Contains information to be used by the UPF for header enrichment. | Only relevant for the uplink direction. |
| Buffering Action Rule (NOTE 5) | Reference to a Buffering Action Rule ID defining the buffering instructions to be applied by the UPF (NOTE 6) | |

NOTE 1:
Needed e.g. in case:
UPF supports multiple DNN with overlapping IP addresses;
UPF is connected to other UPF or NG-RAN node in different IP domains.
NOTE 2:
These attributes are required for FAR action set to forwarding.
NOTE 3:
These attributes are required for FAR action set to forwarding or duplicating.
NOTE 4:
The TSP ID is preconfigured in the SMF, and included in the FAR according to the description in clauses 5.6.7 and 6.1.3.14 of 23.503 [45] for local N6 steering and 6.1.3.14 of 23.503 [45] for N6-LAN steering. The TSP ID action is enforced before the Outer header creation actions.
NOTE 5:
This attribute is present for FAR action set to buffering.
NOTE 6:
The buffering action rule is created by the SMF and associated with the FAR in order to apply a specific buffering behaviour for DL packets requested to be buffered, as described in clause 5.8.3 and clause 5.2.4 in TS 29.244 [65].

In some embodiments, the SMF may provide instructions to the UPF for at least the following behaviors: buffer downlink packets with the additional options of reporting the arrival of first downlink packet and/or reporting the first discarded downlink packet, or drop packet.

When the UP connection of the PDU Session is deactivated and the SMF decides to activate buffering in UPF for the session, the SMF may inform the UPF to start buffering packets for this PDU Session. Buffering in the UPF may be configured based on timers or the amount of downlink data to be buffered. The SMF may decide whether buffering timers or amount of downlink data are handled by the UPF or SMF.

After starting buffering, when the first downlink packet arrives, the UPF may inform the SMF if it is setup to report. The UPF may send a downlink data notification message to the SMF via N4 unless specified otherwise and indicates the Packet Detection Rule (PDR) for which the downlink packet was received.

After starting buffering, when the first downlink packet in a configured period of time that has been buffered is discarded by the UPF because the configured buffering time or amount of downlink data to be buffered is exceeded, the UPF may inform the SMF if it is setup to report. The UPF may send a dropped downlink data notification message to the SMF via N4 and indicates the PDR for which the downlink packet was received. A new report may be sent if a buffered downlink packet is discarded after the configured period of time.

When the UP connection of the PDU Session is activated, the SMF may update the UPF of the change in buffering state. The buffered data packets, if any, are then forwarded to the (R)AN by the UPF. If the UP connection of the PDU Session has been deactivated for a long time, the SMF may indicate the UPF to stop buffering for this PDU Session.

Figure 4A:
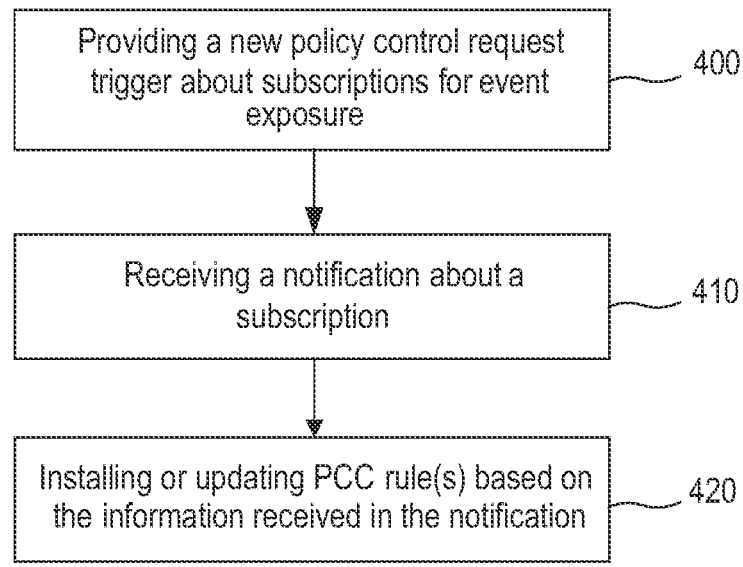
FIG. 4a illustrates an example flow diagram of a method, according to an embodiment.

FIG. 4a illustrates an example flow diagram of a method for notification(s) about event subscription(s), according to one example embodiment. In certain example embodiments, the flow diagram of FIG. 4a may be performed by a network entity or network node in a 3GPP system, such as LTE or 5G NR. For instance, in some example embodiments, the method of FIG. 4a may be performed by a PCF as depicted in the example diagrams of FIGS. 1-3. Therefore, in certain embodiments, the method may include any of the procedures performed at the PCF in FIGS. 1-3.

As illustrated in the example of FIG. 4a, the method may include, at 400, providing a new policy control request trigger about subscriptions for event exposure received by a SMF. The method may also include, at 410, receiving a notification, from the SMF, about a subscription. For example, the receiving 410 may include receiving the notification when the SMF receives a subscription request for notifications about one or several events from another network function. For instance, the subscription may include a subscription for the 'downlink data delivery status' event from a UDM using the Nsmf_EventExposure service. In an embodiment, the receiving 410 may also include receiving a request for new policies using the Npcf_SMPolicyControl_UpdateNotify service operation. In some embodiments, the receiving 410 may also include receiving possible parameters the SMF received as part of the subscription request within that notification. For example, the received parameters may include packet filters and a target address for notifications for the 'downlink data delivery status' event.

In one embodiment, the method of FIG. 4a may also include, at 420, installing or updating PCC rule(s) based on the information received in the notification from the SMF. For instance, in an embodiment, for the 'downlink data delivery status' event, the installing 420 may include installing a PCC rule with the receiving packet filters, an indication to apply extended buffering, a new "AF subscription to downlink data delivery status events IE", and/or the received notification target address.

Figure 4B:
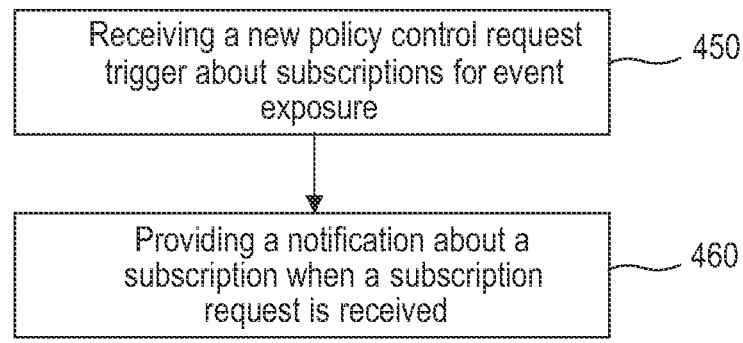
FIG. 4b illustrates an example flow diagram of a method, according to another embodiment.

FIG. 4b illustrates an example flow diagram of a method for notification(s) about event subscription(s), according to one example embodiment. In certain example embodiments, the flow diagram of FIG. 4b may be performed by a network entity or network node in a 3GPP system, such as LTE or 5G NR. For instance, in some example embodiments, the method of FIG. 4b may be performed by a SMF as depicted in the example diagrams of FIGS. 1-3. Therefore, in certain embodiments, the method may include any of the procedures performed at the SMF in FIGS. 1-3.

As illustrated in the example of FIG. 4b, the method may include, at 450, receiving, from a PCF, a new policy control request trigger about subscriptions for event exposure received by the SMF. The method may also include, at 460, when the SMF receives a subscription request for notifications about one or several events from another network function, providing a notification, to the PCF, about the subscription. For example, the providing 460 may include providing the notification when the SMF receives a subscription request for notifications about one or several events from another network function. For instance, the subscription may include a subscription for the 'downlink data delivery status' event from a UDM using the Nsmf_EventExposure service. In an embodiment, the providing 460 may also include transmitting a request for new policies using the Npcf_SMPolicyControl_UpdateNotify service operation. In some embodiments, the providing 460 may also include providing, to the PCF, possible parameters the SMF received as part of the subscription request within that notification. For example, the parameters may include packet filters and a target address for notifications for the 'downlink data delivery status' event.

FIG. 5a illustrates an example of an apparatus 10 according to an embodiment. In an embodiment, apparatus 10 may be a node, host, or server in a communications network or serving such a network. For example, apparatus 10 may be a AF, UPF, SMF, PCF, UDM, NEF, UDR, AMF, base station, a Node B, an evolved Node B (eNB), 5G Node B or access point, next generation Node B (NG-NB or gNB), CU of a gNB, WLAN access point, serving gateway (SGW), mobility management entity (MME), a data management entity (e.g., UDM), and/or other entity associated with a radio access network, such as 5G or NR. In one example, apparatus 10 may represent a PCF as depicted in FIG. 1, 2 or 3.

As illustrated in the example of FIG. 5a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 5a, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or entity, such as a PCF or AF, or the like. According to certain embodiments, apparatus 10 may be controlled by memory 14 and processor 12 to perform the functions associated with any of the embodiments described herein. For example, in some embodiments, apparatus 10 may be configured to perform one or more of the processes depicted in any of the flow charts or signaling diagrams described herein, such as the signaling diagram illustrated in FIGS. 1-3 or flow chart of FIG. 4a or 4b. For instance, in some examples, apparatus 10 may correspond to or represent the PCF depicted in FIGS. 1-3. In certain embodiments, apparatus 10 may be configured to perform a procedure for event subscription notification as described in example embodiments discussed herein.

FIG. 5b illustrates an example of an apparatus 20 according to another example embodiment. In example embodiments, apparatus 20 may be a node or server associated with a radio access network, such as a LTE network, 5G or NR or other radio systems which might benefit from an equivalent procedure. For example, apparatus 20 may be an AF, UPF, SMF, PCF, UDM, NEF, UDR, AMF, base station, a Node B, an evolved Node B (eNB), 5G Node B or access point, next generation Node B (NG-NB or gNB), and/or DU or CU of a gNB associated with a radio access network, such as 5G or NR. It should be noted that one of ordinary skill in the art would understand that apparatus 20 may include components or features not shown in FIG. 5b.

In some example embodiments, apparatus 20 may include one or more processors, one or more computer-readable storage medium (for example, memory, storage, or the like), one or more radio access components (for example, a modem, a transceiver, or the like), and/or a user interface. In some example embodiments, apparatus 20 may be configured to operate using one or more radio access technologies, such as GSM, LTE, LTE-A, NR, 5G, WLAN, WiFi, NB-IoT, MulteFire, and/or any other radio access technologies. It should be noted that one of ordinary skill in the art would understand that apparatus 20 may include components or features not shown in FIG. 5b.

As illustrated in the example of FIG. 5b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 4b, multiple processors may be utilized according to other example embodiments. For example, it should be understood that, in certain example embodiments, apparatus 20 may include two or more processors that may form a multiprocessor system (e.g., in this case processor 22 may represent a multiprocessor) that may support multiprocessing. In certain example embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an example embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In example embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, BT-LE, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, in one example embodiment, transceiver 28 may be configured to modulate information on to a carrier waveform for transmission by the antenna(s) 25 and demodulate information received via the antenna(s) 25 for further processing by other elements of apparatus 20. In other example embodiments, transceiver 28 may be capable of transmitting and receiving signals or data directly. Additionally or alternatively, in some example embodiments, apparatus 10 may include an input and/or output device (I/O device). In certain examples, apparatus 20 may further include a user interface, such as a graphical user interface or touchscreen.

In an example embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR. For instance, in an example embodiment, link 70 may represent the Xn interface.

According to some example embodiments, processor 22 and memory 24 may be included in or may form a part of processing circuitry or control circuitry. In addition, in some example embodiments, transceiver 28 may be included in or may form a part of transceiving circuitry.

As discussed above, according to example embodiments, apparatus 20 may be a network node or functions, such as an AF, AMF, SMF, NEF, UDR and/or UDM. According to certain examples, apparatus 20 may be controlled by memory 24 and processor 22 to perform the functions associated with example embodiments described herein. For instance, in some example embodiments, apparatus 20 may be configured to perform one or more of the processes depicted in any of the diagrams or signaling flow diagrams described herein, such as those illustrated in FIGS. 1-3 and FIG. 4a or 4b. As an example, apparatus 20 may correspond to the SMF and/or UPF illustrated in FIGS. 1-3. In example embodiments, apparatus 20 may be configured to perform a procedure for event subscription notification as described in example embodiments discussed herein.

FIG. 5c illustrates an example of an apparatus 30 according to another example embodiment. In an example embodiment, apparatus 30 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device or NB-IoT device, a connected car, or the like. As one example, apparatus 30 may be implemented in, for instance, a wireless handheld device, a wireless plug-in accessory, or the like.

In some example embodiments, apparatus 30 may include one or more processors, one or more computer-readable storage medium (for example, memory, storage, or the like), one or more radio access components (for example, a modem, a transceiver, or the like), and/or a user interface. In some example embodiments, apparatus 30 may be configured to operate using one or more radio access technologies, such as GSM, LTE, LTE-A, NR, 5G, WLAN, WiFi, NB-IoT, MulteFire, and/or any other radio access technologies. It should be noted that one of ordinary skill in the art would understand that apparatus 30 may include components or features not shown in FIG. 5c.

As illustrated in the example of FIG. 5c, apparatus 30 may include or be coupled to a processor 32 for processing information and executing instructions or operations. Processor 32 may be any type of general or specific purpose processor. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 32 is shown in FIG. 5c, multiple processors may be utilized according to other example embodiments. For example, it should be understood that, in certain example embodiments, apparatus 30 may include two or more processors that may form a multiprocessor system (e.g., in this case processor 32 may represent a multiprocessor) that may support multiprocessing. In certain example embodiments, the multiprocessor system may be tightly coupled or loosely coupled (e.g., to form a computer cluster).

Processor 32 may perform functions associated with the operation of apparatus 30 including, as some examples, precoding of antenna gain/phase parameters, encoding and decoding of individual bits forming a communication message, formatting of information, and overall control of the apparatus 30, including processes related to management of communication resources.

Apparatus 30 may further include or be coupled to a memory 34 (internal or external), which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 34 can be comprised of any combination of random access memory (RAM), read only memory (ROM), static storage such as a magnetic or optical disk, hard disk drive (HDD), or any other type of non-transitory machine or computer readable media. The instructions stored in memory 34 may include program instructions or computer program code that, when executed by processor 32, enable the apparatus 30 to perform tasks as described herein.

In an example embodiment, apparatus 30 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 32 and/or apparatus 30.

In some example embodiments, apparatus 30 may also include or be coupled to one or more antennas 35 for receiving a downlink signal and for transmitting via an uplink from apparatus 30. Apparatus 30 may further include a transceiver 38 configured to transmit and receive information. The transceiver 38 may also include a radio interface (e.g., a modem) coupled to the antenna 35. The radio interface may correspond to a plurality of radio access technologies including one or more of GSM, LTE, LTE-A, 5G, NR, WLAN, NB-IoT, BT-LE, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 38 may be configured to modulate information on to a carrier waveform for transmission by the antenna(s) 35 and demodulate information received via the antenna(s) 35 for further processing by other elements of apparatus 30. In other example embodiments, transceiver 38 may be capable of transmitting and receiving signals or data directly. Additionally or alternatively, in some example embodiments, apparatus 30 may include an input and/or output device (I/O device). In certain example embodiments, apparatus 30 may further include a user interface, such as a graphical user interface or touchscreen.

In an example embodiment, memory 34 stores software modules that provide functionality when executed by processor 32. The modules may include, for example, an operating system that provides operating system functionality for apparatus 30. The memory may also store one or more functional modules, such as an application or program, to provide additional functionality for apparatus 30. The components of apparatus 30 may be implemented in hardware, or as any suitable combination of hardware and software. According to an example embodiment, apparatus 30 may optionally be configured to communicate with apparatus 10 via a wireless or wired communications link 71 and/or to communicate with apparatus 20 via a wireless or wired communications link 72, according to any radio access technology, such as NR.

According to some example embodiments, processor 32 and memory 34 may be included in or may form a part of processing circuitry or control circuitry. In addition, in some example embodiments, transceiver 38 may be included in or may form a part of transceiving circuitry.

As discussed above, according to some example embodiments, apparatus 30 may be a UE, mobile device, mobile station, ME, IoT device and/or NB-IoT device, for example. According to certain example embodiments, apparatus 30 may be controlled by memory 34 and processor 32 to perform the functions associated with example embodiments described herein.

Therefore, certain example embodiments provide several technological improvements, enhancements, and/or advantages over existing technological processes and constitute an improvement at least to the technological field of wireless network control and management. As a result, example embodiments may at least improve throughput, latency, and/or processing speed of network nodes and/or UEs. Accordingly, the use of certain example embodiments results in improved functioning of communications networks and their nodes, such as base stations, eNBs, gNBs, and/or UEs or mobile stations.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations required for implementing functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

We claim:

1. A method, at a first network entity, comprising:
providing, to a second network entity, a policy control request trigger about subscriptions for event exposure by at least one additional network entity or function;
receiving a notification, from the second network entity, about the policy control request trigger; and
installing or updating at least one policy and charging control (PCC) rule to be implemented by the second network entity based on the information received in the notification from the second network entity.

2. The method according to claim 1, wherein the receiving comprises receiving the notification when the second network entity receives a subscription request for notifications about one or several events from the at least one additional network entity or function.

3. The method according to claim 2, wherein the subscription request comprises a subscription for a downlink data delivery status event.

4. The method according to claim 3, wherein the subscription for the downlink data delivery status event is from a universal data management (UDM).

5. The method according to claim 1, wherein the receiving comprises receiving a request for new policies using a Npcf_SMPPolicyControl_UpdateNotify service operation.

6. The method according to claim 1, wherein the receiving comprises receiving possible parameters related to the subscription within the notification.

7. The method according to claim 6, wherein the received parameters comprise at least one of at least one packet filter and a target address for notifications for the downlink data delivery status event.

8. The method according to claim 7, wherein the installing comprises installing a policy and charging control (PCC) rule with the at least one packet filter.

9. The method according to claim 8, wherein the policy and charging control (PCC) rule further comprises at least one of an indication to apply extended buffering, a new application function subscription to downlink data delivery status events information element, or the target address.

10. The method according to claim 1, wherein the first network entity comprises a policy control function (PCF).

11. The method according to claim 1, wherein the second network entity comprises a session management function (SMF).

12. An apparatus, comprising:
at least one processor; and
at least one memory comprising computer program code, wherein the at least one memory and computer program code are configured, with the at least one processor, to cause the apparatus at least to
provide, to a second network entity, a policy control request trigger about subscriptions for event exposure by at least one additional network entity or function;
receive a notification, from the second network entity, about the policy control request trigger; and
install or update at least one policy and charging control (PCC) rule to be implemented by the second network entity based on the information received in the notification from the second network entity.

13. The apparatus according to claim 12, wherein the at least one memory and computer program code are configured, with the at least one processor, to cause the apparatus at least to receive the notification when the second network entity receives a subscription request for notifications about one or several events from the at least one additional network entity or function.

14. The apparatus according to claim 13, wherein the subscription request comprises a subscription for a downlink data delivery status event.

15. The apparatus according to claim 14, wherein the subscription for the downlink data delivery status event is from a universal data management (UDM).

16. The apparatus according to claim 12, wherein the at least one memory and computer program code are configured, with the at least one processor, to cause the apparatus at least to receive a request for new policies using a Npcf_SMPolicyControl_UpdateNotify service operation.

17. The apparatus according to claim 12, wherein the at least one memory and computer program code are configured, with the at least one processor, to cause the apparatus at least to receive possible parameters related to the subscription within the notification.

18. The apparatus according to claim 17, wherein the received parameters comprise at least one of at least one packet filter and a target address for notifications for the downlink data delivery status event.

19. The apparatus according to claim 18, wherein the at least one memory and computer program code are configured, with the at least one processor, to cause the apparatus at least to install a policy and charging control (PCC) rule with the at least one packet filter.

20. The apparatus according to claim 19, wherein the policy and charging control (PCC) rule further comprises at least one of an indication to apply extended buffering, a new application function subscription to downlink data delivery status events information element, or the target address.

21. The apparatus according to claim 12, wherein the apparatus comprises a policy control function (PCF).

22. The apparatus according to claim 12, wherein the second network entity comprises a session management function (SMF).

23. A method, at a first network entity, comprising:
receiving, from a second network entity, a new policy control request trigger about subscriptions for event exposure by a third network entity or function;
receiving a subscription request for notifications about one or several events from the third network entity or function; and
providing a notification, to the second network entity, about the subscription.

24. The method according to claim 23, wherein the subscription comprises a subscription for a downlink data delivery status event, and wherein the third network entity comprises a universal data management (UDM).

25. The method according to claim 23, wherein the providing comprises transmitting a request for new policies using a Npcf_SMPolicyControl_UpdateNotify service operation.

26. The method according to claim 23, wherein the providing comprises providing, to the second network entity, possible parameters received as part of the subscription request within the notification.

27. The method according to claim 26, wherein the parameters comprise at least one of at least one packet filter and a target address for notifications for a downlink data delivery status event.

28. The method according to claim 23, further comprising:
receiving from the second network entity a policy and charging control (PCC) rule with the at least one packet filter; and
configuring a fourth network entity using information received in the policy and charging control (PCC) rule.

29. The method according to claim 28, wherein the policy and charging control rule further comprises at least one of an indication to apply extended buffering, a new application function subscription to downlink data delivery status events information element, or the target address.

30. The method according to claim 23, wherein the first network entity comprises a session management function (SMF).

31. The method according to claim 23, wherein the second network entity comprises a policy control function (PCF).

32. The method according to claim 28, wherein the fourth network entity comprises a user plane function (UPF).

33. An apparatus, comprising:
at least one processor; and
at least one memory comprising computer program code, wherein the at least one memory and computer program code are configured, with the at least one processor, to cause the apparatus at least to
receive, from a second network entity, a new policy control request trigger about subscriptions for event exposure by a third network entity or function;
receive a subscription request for notifications about one or several events from the third network entity or function; and
provide a notification, to the second network entity, about the subscription.

34. The apparatus according to claim 33, wherein the subscription comprises a subscription for a downlink data delivery status event, and wherein the third network entity comprises a universal data management (UDM).

35. The apparatus according to claim 33, wherein the at least one memory and computer program code are configured, with the at least one processor, to cause the apparatus at least to transmit a request for new policies using a Npcf_SMPolicyControl_UpdateNotify service operation.

36. The apparatus according to claim 33, wherein the at least one memory and computer program code are configured, with the at least one processor, to cause the apparatus at least to provide, to the second network entity, possible parameters received as part of the subscription request within the notification.

37. The apparatus according to claim 36, wherein the parameters comprise at least one of at least one packet filter and a target address for notifications for a downlink data delivery status event.

38. The apparatus according to claim 33, wherein the at least one memory and computer program code are configured, with the at least one processor, to cause the apparatus at least to:
receive from the second network entity a policy and charging control (PCC) rule with the at least one packet filter; and
configure a fourth network entity using information received in the policy and charging control (PCC) rule.

39. The apparatus according to claim 38, wherein the policy and charging control rule further comprises at least one of an indication to apply extended buffering, a new application function subscription to downlink data delivery status events information element, or the target address.

40. The apparatus according to any of claim 33, wherein the apparatus comprises a session management function (SMF).

41. The apparatus according to claim 33, wherein the second network entity comprises a policy control function (PCF).

42. The apparatus according to claim 38, wherein the fourth network entity comprises a user plane function (UPF).

\* \* \* \* \*